United States Patent
Jeon

(10) Patent No.: US 7,264,572 B2
(45) Date of Patent: Sep. 4, 2007

(54) HYDRAULIC CONTROL METHOD FOR AN AUTOMATIC TRANSMISSION FOR ACCELERATOR TIP-IN DURING STATIC SHIFTING AND APPARATUS THEREOF

(75) Inventor: Byeong Wook Jeon, Seoul (KR)

(73) Assignee: Hyundai Motor Company, Seocho-Ku, Seoul (KR)

( * ) Notice: Subject to any disclaimer, the term of this patent is extended or adjusted under 35 U.S.C. 154(b) by 237 days.

(21) Appl. No.: 10/991,213

(22) Filed: Nov. 17, 2004

(65) Prior Publication Data
US 2005/0107208 A1 May 19, 2005

(30) Foreign Application Priority Data
Nov. 17, 2003 (KR) ............... 10-2003-0081017

(51) Int. Cl.
 F16H 59/64 (2006.01)
 F16H 61/00 (2006.01)
 G06F 7/00 (2006.01)
(52) U.S. Cl. .................... 477/98; 701/56; 477/177
(58) Field of Classification Search ............ 477/98, 477/125, 127, 156, 117, 143, 148; 701/55, 701/56
See application file for complete search history.

(56) References Cited

U.S. PATENT DOCUMENTS

| 5,468,198 | A | * | 11/1995 | Holbrook et al. | ......... 477/143 |
| 5,680,794 | A | | 10/1997 | Wake | |
| 5,697,864 | A | * | 12/1997 | Watanabe | ............ 477/98 |
| 5,833,573 | A | * | 11/1998 | Inuzuka et al. | .......... 477/143 |
| 6,645,121 | B2 | * | 11/2003 | Wu et al. | ............ 477/98 |
| 2003/0233185 | A1 | * | 12/2003 | Takebayashi et al. | ....... 701/55 |

FOREIGN PATENT DOCUMENTS

DE 69526844 T2 9/2002

* cited by examiner

Primary Examiner—Roger L. Pang
(74) Attorney, Agent, or Firm—Morgan Lewis & Bockius LLP

(57) ABSTRACT

A duty jumping amount at an actual shift-begin point (SB point) during static shifting is calculated dependent on an automatic transmission fluid temperature and a turbine torque. Therefore, an adjustment of hydraulic pressure supplied to an on-coming clutch at the SB point is optimized, and thereby a shift feel of an automatic transmission may be improved.

14 Claims, 4 Drawing Sheets

HYDRAULIC CONTROL METHOD FOR AN AUTOMATIC TRANSMISSION FOR ACCELERATOR TIP-IN DURING STATIC SHIFTING AND APPARATUS THEREOF

CROSS-REFERENCE TO RELATED APPLICATIONS

This application claims priority of Korean Application No. 10-2003-0081017, filed Nov. 17, 2003, the disclosure of which is incorporated herein by reference.

FIELD OF THE INVENTION

Generally, the present invention relates to an automatic transmission. More particularly, the present invention relates to a hydraulic control method and apparatus for an automatic transmission for accelerator tip-in during static shifting.

BACKGROUND OF THE INVENTION

A typical automatic transmission (AT) includes a torque converter and a powertrain with a multiple speed gear mechanism connected to the torque converter. In addition, a hydraulic control system is provided for selectively operating at least one operational element included in the powertrain, according to the running state of a vehicle.

When it is determined that an upshift is required on the basis of vehicle speed and throttle valve opening, a transmission control unit (TCU) starts upshift control by starting control of a solenoid valve in the AT, which is usually called "shift-start point" and is abbreviated as "SS point". By starting the solenoid valve control, after a certain period, an off-going frictional element begins releasing its hydraulic pressure, and an on-coming element begins to be supplied with a hydraulic pressure, which is usually called "shift-begin point" and is abbreviated as "SB point". The period after the SS point to the SB point becomes a delay period which is not used for an actual shifting operation of the AT. Such a period after the SS point to the SB point is usually called a torque phase.

So, an actual shifting period (also called an inertia phase) of the AT begins at the SB point and finishes at a time point at which the off-going element is fully disengaged and the on-coming element is fully engaged. Such a time point at which the off-going element is fully disengaged and the on-coming element is fully engaged is usually called "shift-finish point" and is abbreviated as "SF point". In this sense, such SB point is understood as an actual shift-begin point at which a shifting operation actually begins.

Generally a vehicle equipped with an AT starts moving forward or rearward by static shifting such as N→D or N→R shifting. Therefore, control of such static shifting is an important part in features of an AT. Regarding conventional duty control in such static shifting, adjustment of a duty begins after a predetermined fill time after an SS point, and the duty is decreased by a predetermined jumping amount at an SB point for enhancing shift feel.

FIG. 1 illustrates a duty control pattern for an on-coming frictional element in the case of a static N-D shifting according to the prior art, and a reducing jumping amount is adopted to enhance a shift feel related to an engagement of an on-coming frictional element. That is, adjustment of a duty begins after a predetermined fill time F after an SS point, and the duty is decreased by a jumping amount Dp at a shift-begin (SB) point for reducing a shift shock. According to such a duty control scheme during static shifting, the duty is controlled in the same manner regardless of whether an accelerator pedal is tipped in.

FIG. 2 illustrates a duty control pattern for an on-coming frictional element in the case of accelerator tip-in during static N-D shifting also according to the prior art. In the case of accelerator tip-in during static shifting, engine torque increases in response to the accelerator operation. Therefore, as shown in FIG. 2, the same duty jumping amount Dp is applied at the SB point to reduce the duty even though an accelerator is in a tip-in state during static shifting. Accordingly, a turbine speed abruptly increases due to an increased engine torque, and subsequently, the turbine speed abruptly decreases when a target shift-speed is engaged in the AT. Such abrupt changes in the turbine speed imply a shift shock.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

Embodiments of the present invention provide a hydraulic control method and apparatus for an automatic transmission having non-limiting advantages of reduced shift shock in a tip-in state during static shifting.

An exemplary hydraulic control apparatus for an automatic transmission according to an embodiment of the present invention includes at least one sensor including an ATF temperature sensor for detecting an ATF temperature, at least one electronic control unit for controlling a duty for an on-coming frictional element of an automatic transmission on the basis of signals from the at least one sensor, and an actuator for achieving the duty of the on-coming frictional element under the control of the at least one electronic control unit, wherein the at least one electronic control unit executes instructions of a hydraulic control method for an automatic transmission according to an embodiment of the present invention.

An exemplary hydraulic control method for an automatic transmission according to an embodiment of the present invention includes: detecting at least one sensor signal including a signal for an ATF temperature; determining, on the basis of the at least one detected sensor signal, whether static shifting has been started; determining, in the case that static shifting has been started, whether a duty jump condition is met; calculating a turbine torque in the case that the duty jump condition is met; calculating a duty jumping amount on the basis of the calculated turbine torque and the detected ATF temperature; and controlling a hydraulic duty supplied to an on-coming frictional element in accordance with the calculated duty jumping amount.

In a further embodiment, the at least one sensor signal includes each signal from a throttle position sensor, an engine speed detecting sensor, an accelerator position sensor, an ATF temperature sensor, and an inhibitor switch.

In another further embodiment, whether static shifting has been started is determined on the basis of a signal from an inhibitor switch.

In another further embodiment, whether a duty jump condition is met is determined on the basis of whether an accelerator is in a tip-in state at an actual shift-begin point (SB point).

In another further embodiment, the calculating of the duty jumping amount calculates the duty jumping amount using a predetermined function dependent on the ATF temperature and the turbine torque.

In another further embodiment, for at least one combination of the values of ATF temperature and the turbine torque, the calculating of the duty jumping amount produces the duty jumping amount as a value that increases hydraulic pressure on an on-coming clutch.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
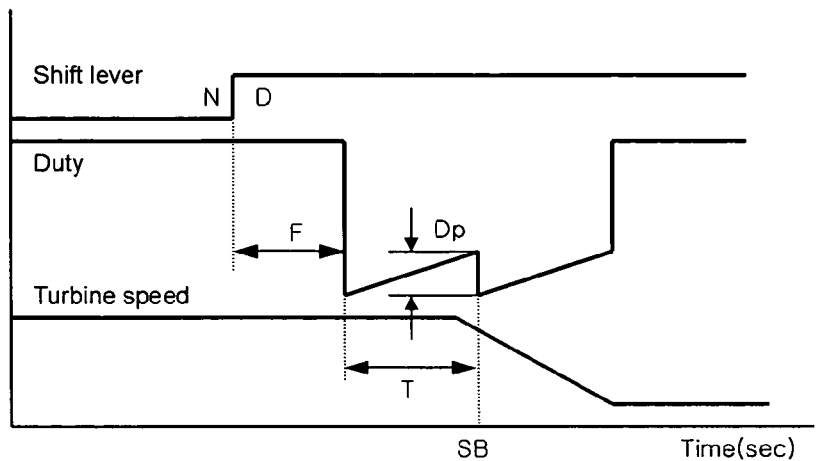
FIG. 1 illustrates a duty control pattern for an on-coming frictional element in the case of a static N-D shifting according to the prior art.
Figure 2:
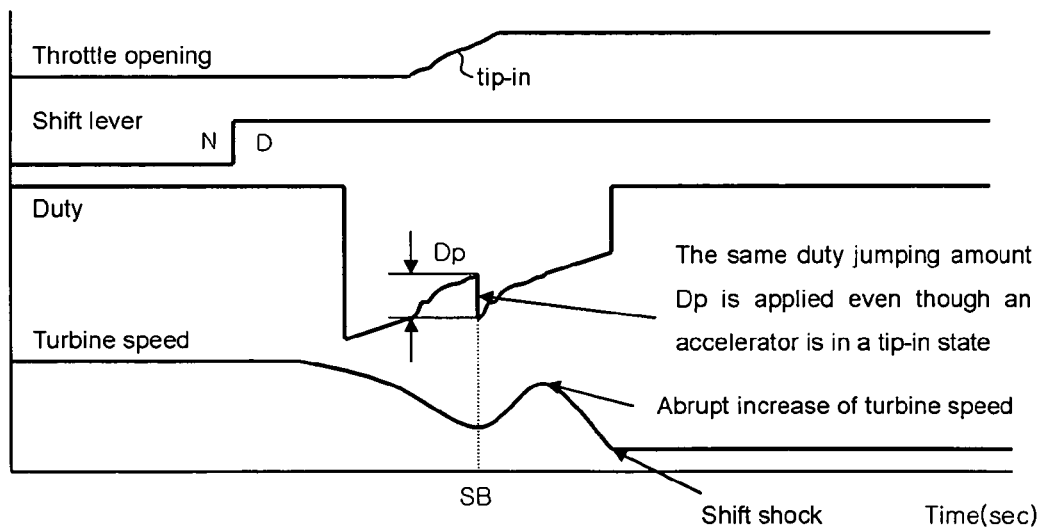
FIG. 2 illustrates a duty control pattern for an on-coming frictional element in the case of accelerator tip-in during a static N-D shifting according to the prior art.
Figure 3:
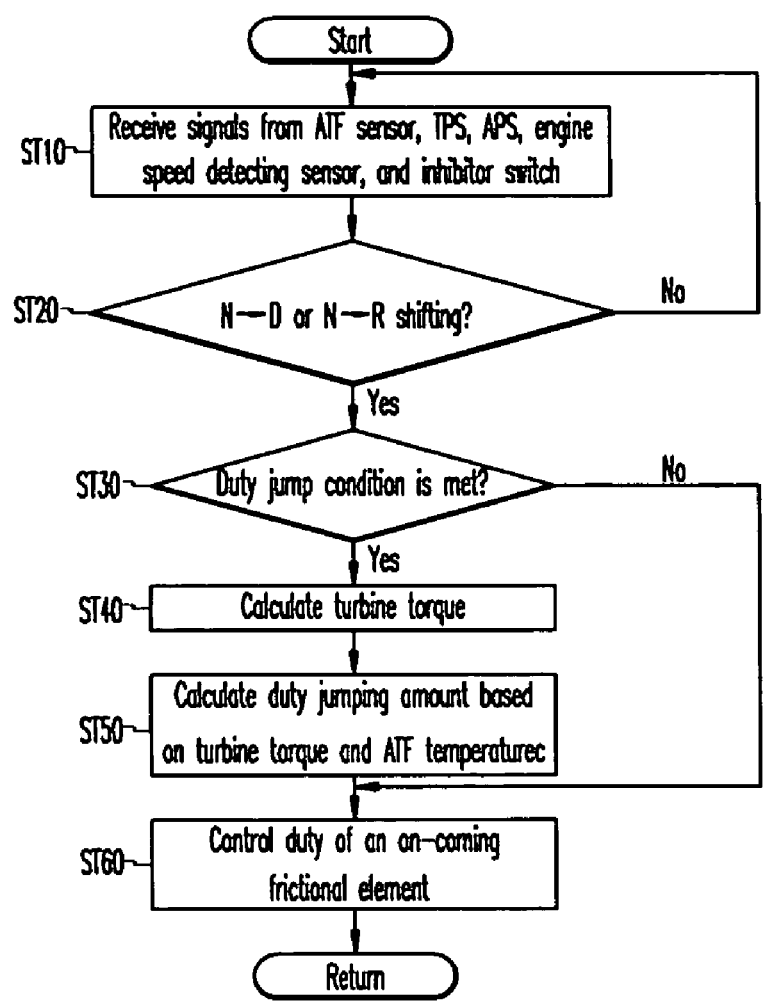
FIG. 3 is a flowchart showing a hydraulic control method for an automatic transmission for accelerator tip-in during static shifting according an embodiment of the present invention.

FIG. 3 is a flowchart showing a hydraulic control method for an automatic transmission for accelerator tip-in (i.e., a rapid increase in throttle opening) during static shifting according to an embodiment of the present invention. According to such a method, a duty jumping amount Dp at a shift-begin (SB) point is obtained as a function dependent on an automatic transmission fluid (ATF) temperature and a turbine torque.

Figure 4:
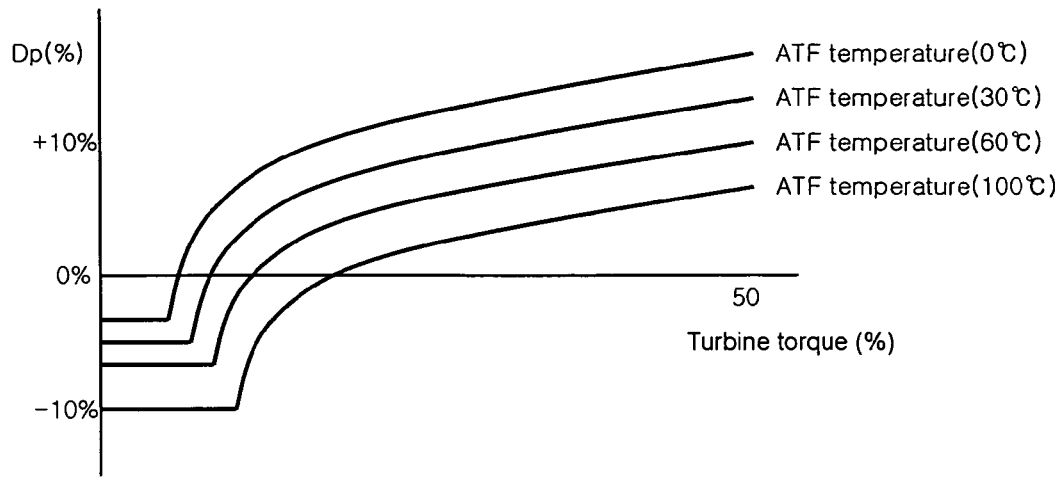
FIG. 4 illustrates a functional relationship of a reducing jumping amount at a shift-begin (SB) point with respect to an ATF temperature and a turbine torque according to an embodiment of the present invention.
Figure 6:
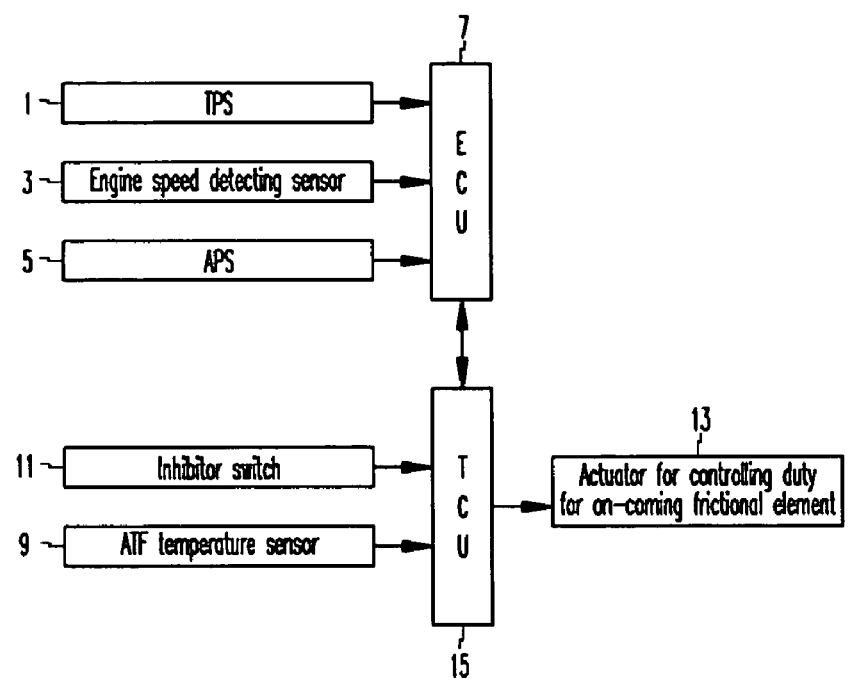
FIG. 6 is a block diagram showing a hydraulic control apparatus for an automatic transmission for accelerator tip-in during static shifting according to an embodiment of the present invention.

The duty jumping amount Dp at the SB point is calculated as a function dependent on an ATF temperature and a turbine torque [%] as shown in FIG. 4, and the calculated values are stored in a transmission control unit (TCU) 15 (refer to FIG. 6). Therefore, when the ATF temperature is detected and the turbine torque is calculated, a value of the duty jumping amount Dp corresponding thereto may be obtained.

Figure 5:
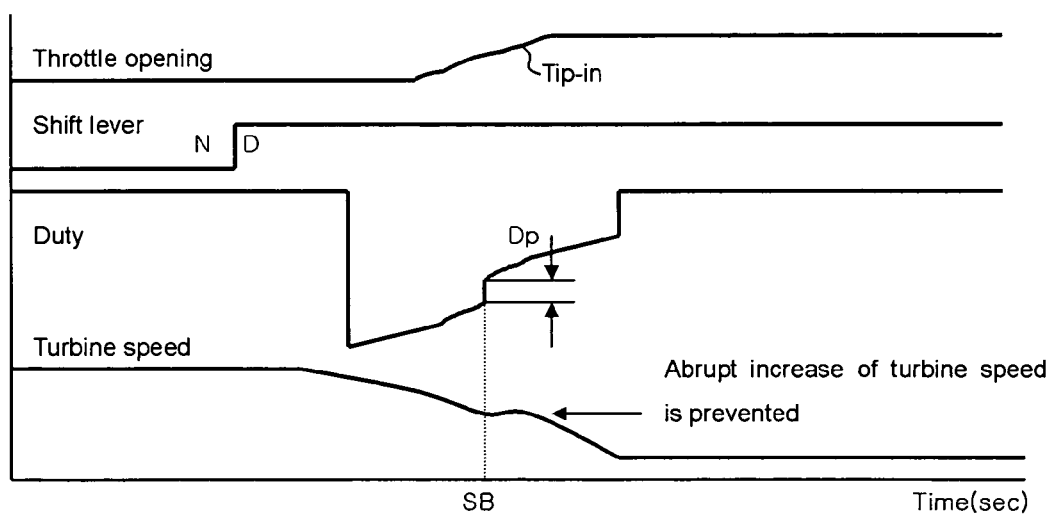
FIG. 5 illustrates a duty control pattern for an on-coming frictional element in the case of accelerator tip-in during static shifting according to an embodiment of the present invention.

According to a control method of an embodiment of the present invention that calculates the duty jumping amount Dp based on such a function of the ATF temperature and the turbine torque, a duty control pattern may be obtained, e.g., as shown in FIG. 5.

To realize such a hydraulic control method, a hydraulic control apparatus according to an embodiment of the present invention includes, as shown in FIG. 6, a throttle position sensor (TPS) 1 for detecting a throttle opening, an engine speed detecting sensor 3 for detecting an engine speed, an accelerator position sensor (APS) 5 for detecting an acceleration operation, an engine control unit (ECU) 7 connected to the sensors 1, 3, and 5 so as to receive signals therefrom, an ATF temperature sensor 9 for detecting an automatic transmission fluid (ATF) temperature, an inhibitor switch 11 for detecting a shift lever position, a transmission control unit (TCU) 15 connected to the sensors 9 and 11 to determine a duty jumping amount based on signals received therefrom, and an actuator 13 for realizing a required duty of an on-coming clutch under the control of the TCU 15. As is obvious to a person of ordinary skill in the art, the actuator 13 may be realized by a plurality of solenoid valves.

The TCU 15 and the ECU 7 are interconnected to communicate information, and the TCU 15 receives a throttle position sensor signal, an engine speed sensor signal, and an accelerator position sensor signal via the ECU 7. The TCU 15 stores values of the duty jumping amount Dp obtained from a function of the ATF temperature and the turbine torque.

The TCU 15 and the ECU 17 can be respectively realized by one or more processors activated by predetermined programs, and the predetermined programs can be programmed to perform each corresponding step of a method according to an embodiment of the present invention.

According to a hydraulic control method of an embodiment of the present invention, firstly at step ST10, signals corresponding to an accelerator tip-in state (i.e., a state that a throttle opening rapidly increases) during static shifting are input to the ECU 7 and the TCU 15. That is, signals from the throttle position sensor 1, the engine speed detecting sensor 3, and the accelerator position sensor 5 are input to the ECU 7, and signals from the ATF temperature sensor 9 and the inhibitor switch 11 are input to the TCU 15.

Subsequently at step ST20, the TCU 15 determines, on the basis of the signal from the inhibitor switch 11 that detects a shift lever operation, whether static shifting (i.e., an N→D or an N→R shifting) has been started. Such a signal from the inhibitor switch 11 is exemplarily shown in FIG. 5.

In the case that the static shifting has been started, the TCU 15 determines whether a duty jump condition is met at step ST30. At the step ST30, whether a duty jump condition is met is determined on the basis of whether an accelerator is in a tip-in state at a shift-begin (SB) point as shown in FIG. 5.

In the case that the duty jump condition is met, subsequently at step ST40, the TCU 15 calculates, in a percent scale, a turbine torque corresponding to the throttle opening in the tip-in state. The turbine torque corresponding to the throttle opening may be calculated according to a conventional manner known to a person of ordinary skill in the art.

Subsequently at step ST50, the TCU 15 calculates the duty jumping amount Dp on the basis of the calculated turbine torque and the detected ATF temperature.

The duty jumping amount Dp may be calculated from a functional relationship with respect to the ATF temperature and the turbine torque as shown in FIG. 4, and values of the duty jumping amount Dp are calculated and stored in the TCU 15 with respect thereto.

Subsequently at step ST60, the TCU 15 controls a hydraulic duty supplied to an on-coming frictional element in accordance with the calculated duty jumping amount Dp.

Such a duty jumping amount Dp optimizes an adjustment of hydraulic pressure supplied to an on-coming clutch at the SB point, in an accelerator tip-in state during static shifting.

For example, as shown in FIG. 5, for some values of the ATF temperature and the turbine torque, the duty jumping amount Dp may be calculated as values (refer to positive values of the duty jumping amount shown in FIG. 4) that do not decrease but rather increase hydraulic pressure on the on-coming clutch, and in this case, an increase of the turbine speed is suppressed.

Therefore, an abrupt increase of the turbine speed at the SB point is prevented. Consequently, shift feel of static shifting and durability of an automatic transmission are improved.

As described above, according to an embodiment of the present invention, a duty jumping amount at a shift-begin (SB) point during static shifting is calculated dependent on an ATF temperature and a turbine torque. Therefore, an adjustment of hydraulic pressure supplied to an on-coming clutch at the SB point is optimized, and thereby a shift feel of an automatic transmission may be improved.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A hydraulic control method for an automatic transmission for an accelerator tip-in during static shifting, the method comprising:
   detecting at least one sensor signal including a signal for an automatic transmission fluid temperature;
   determining, on the basis of the at least one detected sensor signal, whether static shifting has been started;
   determining, in the case that static has been started, whether a duty jump condition is met;
   calculating a turbine torque in the case that the duty jump condition is met;
   calculating a duty jumping amount on the basis of the calculated turbine torque and the detected automatic transmission fluid temperature; and
   controlling a hydraulic duty supplied to an on-coming frictional element in accordance with the calculated duty jumping amount.

2. The method of claim 1, wherein the at least one sensor signal comprises signals from a throttle position sensor, an engine speed detecting sensor, an accelerator position sensor, an automatic transmission fluid temperature sensor, and an inhibitor switch.

3. The method of claim 1, wherein whether static shifting has been started is determined on the basis of a signal from an inhibitor switch.

4. The method of claim 1, wherein whether a duty jump condition is met is determined on the basis of whether an accelerator is in a tip-in state at an actual shift-begin point (SB point).

5. The method of claim 1, wherein the calculating of the duty jumping amount calculates the duty jumping amount using a predetermined function dependent on the automatic transmission fluid temperature and the turbine torque.

6. The method of claim 1, wherein, for at least one combination of the values of automatic transmission fluid temperature and the turbine torque, the calculating of the duty jumping amount produces the duty jumping amount as a value that increases hydraulic pressure on an on-coming clutch.

7. The method of claim 1, wherein:
   the at least one sensor signal comprises each signal from a throttle position sensor, an engine speed detecting sensor, an accelerator position sensor, the automatic transmission fluid temperature sensor, and an inhibitor switch;
   whether static shifting has been started is determined on the basis of a signal from the inhibitor switch;
   whether the duty jump condition is met is determined on the basis of whether an accelerator is in a tip-in state at an actual shift-begin point (SB point);
   the calculating of the duty jumping amount calculates the duty jumping amount using a predetermined function dependent on the automatic transmission fluid temperature and the turbine torque; and
   for at least one combination of the values of the automatic transmission fluid temperature and the turbine torque, the calculating of the duty jumping amount produces the duty jumping amount as a value that increases hydraulic pressure on an on-coming clutch.

8. A hydraulic control apparatus for an automatic transmission for accelerator tip-in during static shifting, the apparatus comprising
   at least one sensor including an automatic transmission fluid temperature sensor for detecting an automatic transmission fluid temperature,
   at least one electronic control unit for controlling a duty for an on-coming frictional element of an automatic transmission on the basis of signals from the at least one sensor, and
   an actuator for achieving the duty of the on-coming frictional element under the control of the at least one electronic control unit,
   wherein the at least one electronic control unit executes instructions for:
      detecting at least one sensor signal including a signal for an automatic transmission fluid temperature;
      determining, on the basis of the at least one detected sensor signal, whether static shifting has been started;
      determining, in the case that static shifting has been started, whether a duty jump condition is met;
      calculating a turbine torque in the case that the duty jump condition is met;
      calculating a duty jumping amount on the basis of the calculated turbine torque and the detected automatic transmission fluid temperature; and
      controlling a hydraulic duty supplied to an on-coming frictional element in accordance with the calculated duty jumping amount.

9. The apparatus of claim 8, wherein:
   the at least one sensor further comprises a throttle position sensor, an engine speed detecting sensor, an accelerator position sensor, and an inhibitor switch; and
   the at least one sensor signal further comprises each signal from the throttle position sensor, the engine speed detecting sensor, the accelerator position sensor, and the inhibitor switch.

10. The apparatus of claim 8, wherein whether static shifting has been started is determined on the basis of a signal from an inhibitor switch.

11. The apparatus of claim 8, wherein whether a duty jump condition is met is determined on the basis of whether an accelerator is in a tip-in state at an actual shift-begin point (SB point).

12. The apparatus of claim 8, wherein the calculating of the duty jumping amount calculates the duty jumping amount using a predetermined function dependent on the automatic transmission fluid temperature and the turbine torque.

13. The apparatus of claim 8, wherein, for at least one combination of the values of automatic transmission fluid temperature and the turbine torque, the calculating of the duty jumping amount produces the duty jumping amount as a value that increases hydraulic pressure on an on-coming clutch.

14. The apparatus of claim 8, wherein:
the at least one sensor further comprises a throttle position sensor, an engine speed detecting sensor, an accelerator position sensor, and an inhibitor switch;
the at least one sensor signal further comprises each signal from the throttle position sensor, the engine speed detecting sensor, the accelerator position sensor, and the inhibitor switch;
whether static shifting has been started is determined on the basis of a signal from an inhibitor switch;
whether a duty jump condition is met is determined on the basis of whether an accelerator is in a tip-in state at an actual shift-begin point (SB point);
the calculating of the duty jumping amount calculates the duty jumping amount using a predetermined function dependent on the automatic transmission fluid temperature and the turbine torque; and
for at least one combination of the values of automatic transmission fluid temperature and the turbine torque, the calculating of the duty jumping amount produces the duty jumping amount as a value that increases hydraulic pressure on an on-coming clutch.

* * * * *